June 20, 1972  L. L. KUCK  3,671,144

TAILGATE WINDOW WASHER MECHANISM

Filed Nov. 23, 1970  2 Sheets-Sheet 1

INVENTOR.
Lloyd L. Kuck
BY
W. A. Schustz
ATTORNEY

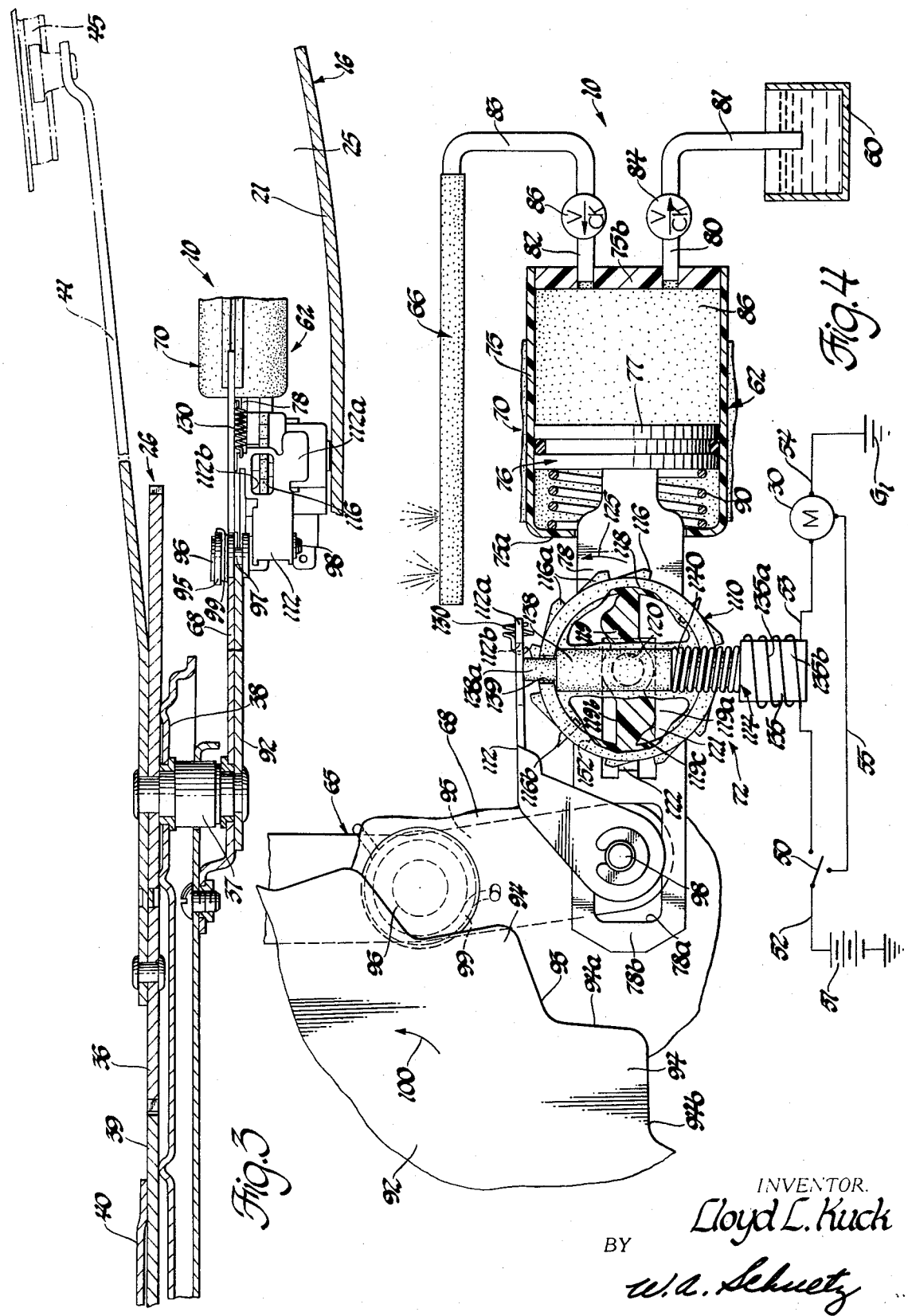

United States Patent Office 3,671,144
Patented June 20, 1972

3,671,144
TAILGATE WINDOW WASHER MECHANISM
Lloyd L. Kuck, Dayton, Ohio, assignor to General Motors Corporation, Detroit, Mich.
Filed Nov. 23, 1970, Ser. No. 91,813
Int. Cl. F04b 17/06
U.S. Cl. 417—231                                4 Claims

ABSTRACT OF THE DISCLOSURE

In a preferred form, this disclosure relates to a window washer unit for washing a tailgate window of a station wagon vehicle. The window washer unit includes a reciprocable washer pump, an actuating means including a drive means drivingly connected with a window regulator mechanism for raising and lowering the tailgate window and which has an interruptible driving connection with the reciprocable pump, and a control mechanism which is operable to establish a driving connection between the drive means and the reciprocable pump in response to the window regulator mechanism being actuated to raise the window and for interrupting the driving connection therebetween just prior to the window reaching its closed position and when the window is being lowered whereby the washer pump is only actuated to squirt washer fluid against the window when the latter is being raised from its open position towards its closed position.

---

The present invention relates to a window washer unit for use in washing a window of an automotive vehicle which is movable between open and closed positions, and in particular to a window washer unit for washing a tailgate window of a station wagon when the window is being moved toward its closed position.

Heretofore, window washer units for washing the tailgate window of a station wagon vehicle have been provided. These known units comprised a single washer pump housed within the engine compartment for supplying washer fluid to both the windshield and the tailgate window either simultaneously or selectively. A disadvantage of such a unit is that a conduit means running the length of the vehicle must be provided which results in a loss of pressure. These known washer units have also comprised a separate motor and pump unit usually mounted within the tailgate and which was controlled by a separate switch or control accessible to the operator. This latter type of unit has the disadvantage of being rather expensive.

In accordance with the provisions of the present invention a window washer unit having a reciprocable pump which is driven by a window regulator mechanism for raising and lowering the tailgate window is provided. This eliminates the need for a separate motor and switch means under the control of the operator.

Accordingly, an important object of the present invention is to provide a new and improved window washer unit for a window which is movable between closed and open positions by a window regulator mechanism, and in which the washer unit includes a reciprocable pump means and an actuating mechanism operatively connected with the reciprocable pump and a movable part of the window regulator mechanism so that the pump means is actuated or driven in response to operation of the window regulator mechanism when the latter is actuated to move the window between its positions.

Another object of the present invention is to provide a new and improved window washer unit for a tailgate window of a station wagon vehicle and in which the window is movable between closed and opened positions by a power operated window regulator mechanism, and wherein the washer unit includes a washer pump assembly having a reciprocable pumping element and an actuating mechanism operatively connected with the pump and a rotatable element of the window regulator mechanism, and wherein the actuating mechanism is operable to reciprocate the pumping element to squirt washing fluid against the window in response to rotary movement of the element of the window regulator mechanism when the latter is actuated to move the window from its open position towards its closed position.

A further object of the present invention is to provide a new and improved window washer unit as defined in the next preceding object, and wherein the actuating means includes an actuating cam drivingly connected with the window regulator mechanism and having a generally undulated outer peripheral cam surface and a lever supported for pivotal movement in opposite directions intermediate its ends, and in which the lever is biased into engagement with the undulated outer cam surface of the actuating cam at one end and its other end is operatively connected with the reciprocable pumping element so that rotation of the said actuating cam causes said lever to pivotally move in opposite directions to effect reciprocal movement of the pumping element.

A further object of the present invention is to provide a new and improved window washer unit, as defined in the next preceding object, and wherein said lever of the actuating means has an interruptible driving connection with the reciprocable pumping element, and in which the washer pump assembly includes a control mechanism for establishing a driving connection between the lever and the reciprocable pumping element when the window regulator mechanism is operated to raise the window from its open position towards its closed position and which is operable to disestablish the driving connection therebetween just prior to the window reaching its closed position and when the window is being moved from its closed position towards its open position.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which:

FIG. 3 is a cross-sectional view taken approximately along line 3—3 of FIG. 2; and FIG. 4 is a schematic view of the window washer unit of the present invention.

The present invention provides a novel window washer unit for washing a reciprocable window of an automotive vehicle. Although the window washer unit could be used for washing various vehicle windows which are movable between closed and open positions it is particularly susceptible for use in washing a reciprocable tailgate window of a station wagon vehicle. Accordingly, for the purposes of description and illustration, it will be hereinshown as being used for the latter purpose.

Figure 1:
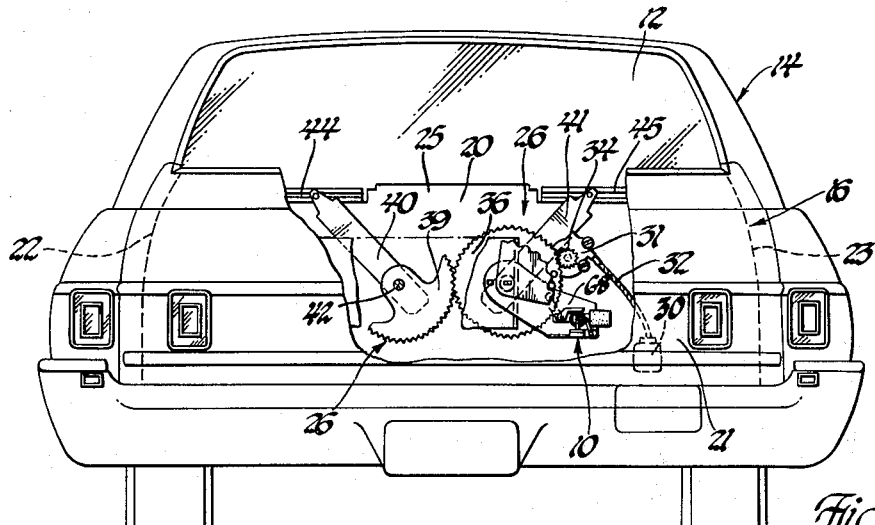
FIG. 1 is a fragmentary rear elevational view of a station wagon embodying the novel window washer unit of the present invention.

As representing a preferred embodiment of the present invention, FIG. 1 of the drawing shows a window washer unit 10 for washing a tailgate window 12 of a station wagon vehicle 14. The station wagon vehicle 14 includes a rear tailgate 16 which is swingable via hinges (not shown) between a vertical closed position, as shown in FIG. 1, and to a horizontal position. The tailgate, preferably, is also swingable about a hinge means (not shown) at its left side between a closed position as shown in FIG. 1 and an open position. The tailgate 16 includes inner, outer and side walls 20–23 which define a tailgate compartment 25 in which a window regulator mechanism 26 and the washer unit 10 are housed.

The window regulator mechanism 26 is operable to move the rear tailgate window 12 between a closed position, as shown in FIG. 1, and an open position (not shown) in the which the window 12 is received within the compartment 25 of the tailgate 16. The window regulator mechanism 26 could be of any suitable or conventional type and is here shown as comprising a reversible electric motor 30 which is drivingly connected to a gear reduction unit 31 by a flexible cable drive 32. The gear reduction unit 31 includes an output or pinion gear 34 which is in meshed engagement with a larger diameter pinion or drive gear 36. The pinion gear 36 is fixed to a shaft 37 rotatably journaled in a bracket means 38 suitably secured to the tailgate 16. The pinion gear 36 in turn is in meshed engagement with a sector gear 39. The sector gear 39 is fixed to a shaft 42 which is rotatably journaled in the bracket means 38. Rigidly secured to the gears 39 and 36 are a pair of upwardly extending arms 40 and 41. The arms 40 and 41 at their upper end carry rollers (not shown) which are slidably received within horizontally disposed guide channels 44 and 45 secured to the window 12 adjacent its lower edge respectively.

When the gear 36 is rotated in a clockwise direction the gear 39 is caused to be moved in a counterclockwise direction. When the gears 36 and 39 are moved in these directions the arms 40 and 41 are moved downwardly to cause the window 12 to be moved from its closed position, as shown in FIG. 1, towards its open position in which it is disposed within the compartment 25 of the tailgate 16. When the gears 36 and 39 are rotated in the opposite directions the arms 40 and 41 are raised to cause the window 12 to be moved from its open position towards its closed position, as shown in FIG. 1. The rollers (not shown) at the upper end of the arms 40 and 41 roll and/or slide within the guide channels 44 and 45 during this movement.

Operation of the window regulator mechanism 26 is adapted to be controlled by a suitable manually manipulatable, single pole, double throw control switch 50 mounted on the dashboard (not shown) of the vehicle. As schematically shown in FIG. 4, the control switch 50 is in operative electrical circuits with the reversible electric motor 30 of the window regulator mechanism 26. The control switch 50 is suitably biased to a neutral position and is movable in opposite directions from its neutral position to selectively effect a raising or lowering of the window 10. When the control switch is moved upwardly, as shown in FIG. 4, a circuit is completed from battery 51, wire 52, control switch 50, wire 53, motor 30, wire 54 to ground $G_1$. The completion of this circuit causes the motor 30 to be rotated in a direction to actuate the window regulator mechanism 26 to move the window 12 in an upward direction towards its closed position. When the switch is moved from its neutral position downwardly to its second position, a circuit is completed from battery 51, wire 52, control switch 50, wire 55, motor 30, wire 54 to ground $G_1$. The completion of this circuit reverses the direction of current flow through the armature of the motor to cause the motor 30 to be rotated in a reverse direction, which in turn causes the window regulator mechanism 26 to be actuated to move the window 12 downwardly towards its open position.

The washer unit 10 is adapted to be operated when the window regulator mechanism 26 is actuated to move the window towards its closed position. The washer unit 10 broadly comprises a reservoir 60 for containing a supply of washer fluid; a washer pump assembly 62; an actuating means 65 for actuating the washer pump assembly 62 only when the window regulator mechanism 26 is actuated to move the window 12 in an upward direction towards its closed position, and a spray bar 66 for emitting washer fluid in jet form against the window 12 as it is being raised.

The washer pump assembly 62 comprises a support means or frame 68 which is rigidly secured to the bracket means 38 for supporting a window regulator mechanism, a reciprocable washer pump 70 carried by the frame and which has an interruptible driving connection with the window regulator mechanism 26 and a control or timer mechanism 72 which is operable to establish a driving connection between the pump 70 and the window regulator mechanism 26 when the latter is actuated to raise the window 12 toward its closed position.

The reciprocable washer pump assembly 62 could be of any suitable type, but is preferably like that disclosed in co-pending application Ser. No. 846,068, filed July 30, 1969, now Pat. No. 3,574,882 and assigned to the same assignee as the present invention. Since the washer pump assembly, per se, does not form a part of the present invention, it will only be described to the extent necessary for a complete understanding of the patent invention.

The washer pump 70 comprises a plastic pump housing 75 secured to the support frame 68 and a reciprocably movable plunger 76 slidably received within the housing. The plunger 76 includes a piston 77 and a flat pump rod 78 having one end connected with the piston and the other end projecting rearwardly i.e., toward the left as viewed FIG. 4, beyond the rearward adjacent end 75a of the pump housing 75. The pump has an inlet 80 which is in communication with the reservoir via a conduit 81. The pump also has an outlet 82 which is in communication with the spray bar 66 via a conduit 83. Suitable check valves 84 and 85 are provided for preventing reverse flow from the pump 70 to the reservoir and from the spray bar 66 to the pump 70 respectively.

The plunger 76 is adapted to be reciprocably moved through intake and discharge strokes. When the plunger is moved through its intake stroke, toward the left as viewed in FIG. 4 of the drawings, washer fluid is drawn from the reservoir 60 via conduit 81, past the check valve 84 and inlet 80 into a chamber 86. When the plunger is moved through its discharge stroke, toward the right as viewed in FIG. 4, the fluid in the chamber 86 is forced under pressure through the outlet 82, past the check valve 85 and delivered via the conduit 83 to the spray bar 66 carried by the tailgate 16 and located adjacent to but beneath the upper edge of the tailgate 16. The reservoir 60 for the washer fluid could either be a separate reservoir mounted within the tailgate 16 of the vehicle 14 or it could be a reservoir mounted in the engine compartment of the vehicle and serve as a washer fluid supply for both the windshield (not shown) and the tailgate window 12 of the vehicle 14.

The plunger 76 is moved through its discharge stroke by a compression spring 90 which encircles the pump rod 78 and has one end in abutting engagement with the end wall 75a of the housing 75 and its other end in abutting engagement with the piston 77 at its side opposite the chamber 86. The compression spring 90 biases the plunger toward engagement with its right end wall 75b as viewed in FIG. 4.

The plunger 76 is adapted to be moved through its intake stroke in opposition to the biasing force of the compression spring 90 by the actuating means 65 when the washer unit 10 is placed in operation. The actuating means 65 comprises a sector shaped cam member 92 which is fixed to the shaft 37 for supporting the gear 36. The sector shaped cam 92 has an outer peripheral cam surface 93 which is undulated or a generally saw tooth shape, as viewed in side elevation. The undulations define cam teeth 94 having rise surfaces 94a and fall surfaces 94b.

The actuating means 65 further includes a lever 95 which is pivotally connected intermediate its ends by a pivot pin means 96 to the frame 68. The lever 95 at its upper end carrier a rotatable, peripherally grooved, cam follower or roller 97 which straddles the cam surface 93 of a sector cam 92. Fixed to the lower end of the lever is a pin means 98 which extends through an elongated slot 78a in the pump rod 78 to provide a lost motion connection between the lever 95 and the pump rod 78, and for reasons to be noted hereinafter. The lever 95 is biased so its upper end engages the peripheral cam surface 93 by a torsion spring 99. The torsion spring 99 extends around the pivot pin means 96 and has one end in engagement with the lever 95 and its other end in engagement with the frame 68.

When the window regulator mechanism 26 is actuated to raise the window and the pump 70 is placed in operation (as will be described hereinafter), the pin means 98 is in engagement with the rearward end 78b of the pump rod 78. As the sector cam 92 is rotated in the direction of the arrow 100, the lever 95 is caused to be moved in opposite directions about the pivot means 96. The pump rod 78 is moved leftward in opposition to the biasing force of the spring 90 to move the piston 77 through its intake stroke when the lever is in engagement with the rise portion 94a of the cam teeth 94 and the spring 90 causes the pump rod 78 to be moved toward the right and the piston 77 through its discharge stroke when the lever 95 is in engagement with the fall position of the cam teeth 94. Thus, the pump rod 78 is caused to be reciprocated back and forth as the sector cam 92 is rotated in the direction of the arrow 100 to provide for intermittent squirts of washer fluid against the window 12.

Operation of the pump 70 is controlled by the control mechanism 72. The control mechanism 72 is operable to establish a driving connection between the pump rod 78 and pin means 98 of the lever 95 of the actuating means 65 when the window regulator mechanism 26 is actuated to raise the window 12 and then to automatically, abruptly interrupt the driving connection therebetween just prior to the window reaching its closed position.

The control mechanism 72 broadly includes a timer means in the form of an indexible ratchet cam assembly 110 for controlling operation of the pump 70 and which in turn has an interruptable driving connection with a drive pawl 112 pivotally connected to the drive pin 98. The control mechanism 110 also includes a control means 114 which is operable, when energized, to establish a drive connection between the ratchet cam assembly 110 and the drive pawl 112 and which disconnects the drive connection therebetween when the window regulator mechanism is either deactuated or when actuated for moving the window downwardly toward its open position.

Figure 2:
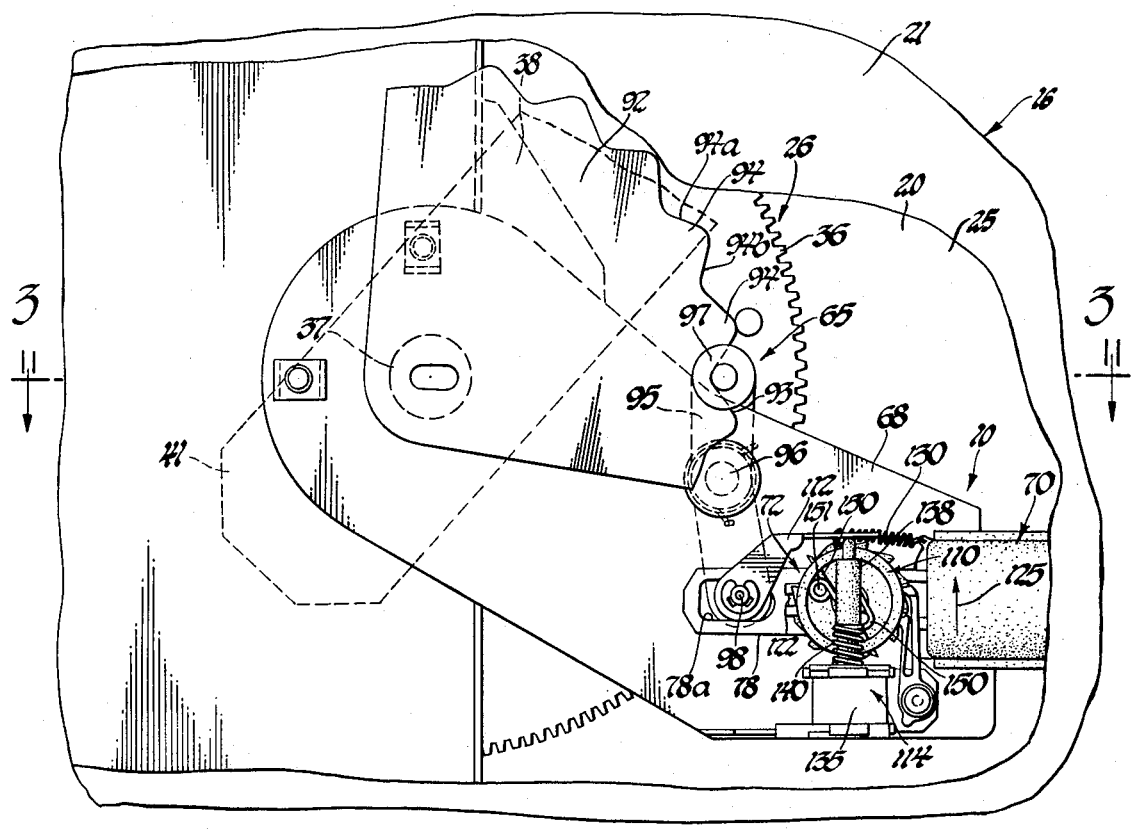
FIG. 2 is an enlarged fragmentary elevational view of part of the window washer unit shown in FIG. 1.

As best shown in FIGS. 2 and 4, the ratchet cam assembly 110 includes a plastic ratchet wheel 116, an annular hollow drum 118 integral with the upper side of the ratchet wheel 116 and a pair of diametrically opposite cams 119 formed integral with the lower side of the ratchet wheel 116. The ratchet cam assembly 110 is rotatably supported on a stub shaft or post 120 which is secured to the support frame 68 and which extends through a second elongated slot 121 in the pump rod 78, the slot enabling the pump to be reciprocated relative to the shaft 120.

The ratchet cam assembly 110 is normally disconnected from the drive pawl 112 and disposed in a stop position, as shown in FIG. 4, in which it interrupts the drive connection between the plunger 76 of the pump 70 and the drive pin 98. When in this position the cam 119 engages a lug or tab 122 extending transversely on the pump rod to hold the plunger 76 against movement through its discharge stroke by the spring 90 and the spring 90 in a charged condition. The provision of the slot 78a in the pump rod 78 provides a lost motion connection between the drive pin 98 and the pump rod 78 to enable the drive pin 98 to move relative to the pump rod 78 so that the drive connection therebetween can be interrupted. The cam 119 is generally wedge shaped and has abrupt rise and fall portions 119a and 119b which extend generally radially of the ratchet wheel 116 and a stepped circumferentially extending dwell portion 119c. When the ratchet cam assembly is in its stop position the outermost step of the dwell portion 119c is in engagement with the lug 122 on the pump rod 78.

The ratchet cam assembly 110 is adapted to be intermittently, rotatably indexed in the direction of the arrow 125 by the drive pawl 112 when the latter is drivingly connected therewith. To this end, the ratchet wheel 116 has a plurality of circumferentially spaced teeth 116a and the pawl 112, which is continuously moved toward and from the ratchet wheel 116 by the drive pin 98 when the window regulator mechanism 26 is being actuated, has an end portion 112a which extends generally tangentially of the ratchet wheel 116 and which is provided with a tooth receiving window or slot 112b. The end of the pawl 112a is biased toward engagement with the periphery of the ratchet wheel 116 by a spring 130 (see FIG. 2) and its free end is adapted to hook behind the adjacently located tooth 116a on the ratchet wheel 116 when the pawl 112 is moved through its return stroke toward the ratchet wheel 116 and to index the ratchet cam assembly 110 in the direction of the arrow 125 when moved through its work stroke away from the ratchet wheel 116 upon the control means 114 is energized.

The drive pawl 112, however, is normally prevented from engaging and indexing the ratchet cam assembly 110 by the control means 114. The control means 114 comprises a solenoid 135 whose coil 135a is supported on a spool 135b and is in series with the motor 30 in the circuit for energizing the latter for raising the window 12, as shown in FIG. 4. The spool 135b has a central opening which slidably receives one end of a plunger 138. The plunger 138 has a metal portion which is slidably received in the opening of the spool 135b and an end portion 138a made from a suitably electric insulating material, such as plastic. The plastic portion 138a at its end remote from the coil includes an axially extending portion (not shown) which is normally disposed within one of a pair of diametral opposite slots 139 in the annular drum 118.

The plunger 138 is biased by a compression spring 140 toward a first or normal position, as shown in FIG. 4, in which the end portion 138a engages the end 112a of the pawl 112 to hold the same spaced from the ratchet wheel 116. The pawl 112 bears against and slides on the end portion 138a when reciprocated therepast by the lever 95 when the window regulator mechanism 26 is operating to lower the window 12. The spring 140 encircles the metal portion of the plunger 138 and has one end in abutting engagement with the spool 135b and its other end in abutting engagement with the inner end of the plastic portion 138a of the plunger 138. The biasing force exerted by the spring 140 is greater than the biasing force exerted by the spring 130.

The plunger 138 is movable in response to energization of the coil 135a from its first or normal position as shown in FIG. 4, to a retracted or second position in which its end 138a is positioned radially inwardly of the drum 118 to permit the end 112a of the pawl 112 to engage and hook around the adjacent tooth 116a of the ratchet wheel 116 to index the latter. When the plunger is in its second position, the axially extending portion (not shown) of the plunger 138 is disposed interiorly of the drum and the spring 140 is compressed.

When the plunger 138 is moved to its retracted position the spring 130 pulls the pawl 112 into engagement with the ratchet teeth 116a to index the ratchet wheel 116 in the direction of the arrow 125. During this first indexing movement the cam 119 is moved from engagement with the tab 122 on the pump rod 78 to enable the spring 90 to move the pump rod 78 and piston 77 through its discharge stroke to discharge water against the window. When the pump rod 78 is moved through its discharge stroke its left end 78b will engage the drive pin 98. Thereafter the sector cam 92 as it is being moved in the direction of the arrow 100 will cause the lever 95 to be pivotally moved in opposite directions. The pump rod is moved toward the left through its intake stroke in opposition to the biasing force of the spring 90 when the lever 95 is pivoted in a clockwise direction, which occurs when it is in engagement with the rise portion 94a of the cam teeth 94. When the lever 95 is in engagement with the fall portion 94b of the cam teeth 94 the spring 90 will pivot the lever in a counterclockwise direction and move the plunger 76 through its discharge stroke. During each clockwise movement of the lever 95 the pawl 112 will engage the next adjacent ratchet tooth 116a to index the ratchet cam assembly 110 in the direction of the arrow 125. When the ratchet cam assembly 110 has been rotated one-half of a revolution the cam 119 will be in engagement with the tab 122 on the pump rod 78 to hold the same against movement and the plunger 138 will be aligned with the slot 139 in the drum 118. This will occur when the window 12 has been raised to its closed position. When the operator releases the manual control switch 50 the coil 135a is de-energized and the spring 140 returns the plunger 138 toward its normal position, as shown in FIG. 4, in which it engages the pawl 112 to hold the same away from the ratchet wheel 116.

In order to preclude any jamming action between the lug 122 on the pump rod 78 and the rise portion 119a of the cam 119, which could cause breakage of the parts, the ratchet wheel 116 is provided with a flexible tooth 116b which is engaged by the drive pawl 112 during its next to the last indexing movement. The flexible tooth 116b yields to allow the lug 122 on the pump rod 78 upon engagement with the rise portion 119a of the cam 119 to clear the latter and then functions to rotate the ratchet cam assembly 110 through the remaining portion of the next to the last indexing movement to position the lower step of the dwell portion 119c in front of the lug 122 on the pump rod 78. When this occurs the plunger 76 is prevented from moving through its discharge stroke. This interrupts the driving connection between the pump rod 78 and the drive pin 98 and with the latter now moving relative to the pump rod 78 due to the provision of the slot 78a in the pump rod 78.

The ratchet wheel 116, however, is indexed one further indexing movement to cause the tab 122 to be positioned from the lower step of the dwell portion 119c to the highest step thereof. Thus, the pump is shut off just prior to the window having been fully raised to its closed position.

The flexible tooth 116b comprises one end portion of a torsion spring 150 carried within the drum 118. The torsion spring is disposed around a post 151 (see FIG. 2) within the drum 118 of the ratchet cam assembly 110 to hold the same in place and the flexible end portion 116b extends through a circumferentially extending slot 152 (see FIG. 4) in the side wall of the ratchet wheel 116. The spring bias is such that the tooth is normally biased into engagement with the ratchet wheel 116 at its rightmost end of the slot, as viewed in FIG. 4, and is disposed midway between two adjacent rigid teeth 116a. The tooth 116b projects radially outwardly an extent equal to the radial extent of the other ratchet teeth 116a.

The flexible tooth 116b is of a sufficient stiffness to enable the pawl 112 to rotate the ratchet cam assembly 110 during its next to the last indexing movement until the rise portion 119a of the cam 119 interferes with the lug 122 on the pump rod 78. When this interference takes place, the drive pawl 112 which continues to move away from the ratchet wheel 116, causes the tooth 116b to yield and be moved relative to the ratchet wheel 116. When the lug 122 of the pump 78 clears the rise portion 119a of the cam 119 the biasing force of the spring 150 causes the ratchet wheel 116 to be rotated through the remaining portion of this indexing movement such that the lower step of the dwell portion 119c of the cam 119 is disposed in front of the lug 122 on the pump rod 78. When this occurs the driving connection between the pump rod 78 and the drive pin 98 is interrupted, since the plunger 76 cannot be moved through its discharge stroke by the spring 90.

The driving connection between the pawl 112 and the ratchet wheel 116 is automatically interrupted on the next indexing movement of the ratchet wheel 116. As the ratchet wheel 116 is moved through its last indexing movement, the slot 139 will be aligned with the plunger 138 and the spring 140 will return the plunger 138 to its normal position in which it holds the drive pawl 112 spaced from the ratchet wheel when the operator releases the control switch 50. Should the operator only partially raise the window, the operation of the pump assembly 62 will be stopped. However, upon resuming operation of the window regulator mechanism 26 to raise the window the remaining cycle of operation of the pump assembly will take place.

The spray bar 66 for emitting the washer fluid in jet form is preferably carried by the tailgate 16 and extends transversely across the window 12. The spray bar 66 could either be a separate spray bar or be part of a squeegee type wiper for wiping the window 12 as it is being raised. Any suitable squeegee wiper could be employed, but preferably the wiper would be one which is cammed to an off glass position as the window is being moved from its closed position towards its open position and cammed to an on glass position as the window is being moved from its open position towards its closed position to cause the window to be wiped as it is being raised.

From the foregoing, it should be apparent that a novel washer unit to be used with a tailgate window of a station wagon vehicle has been provided. It should also be apparent that the washer unit does not require a separate source of power and can be readily actuated by the window regulator mechanism employed for raising and lowering the window of the tailgate.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

I claim:

1. In combination, a station wagon vehicle having a tailgate, a rear tailgate window which is movable between open and closed positions, a window regulator mechanism including a rotatable drive element for moving the window between open and closed positions, and a washer unit for squirting washer fluid against the window when it is being moved from its open position towards its closed position, said washer unit comprising a pump means having a reciprocable pumping element and an actuating means for effecting reciprocable movement of said pumping element when said window is being moved from its open position toward its closed position, said actuating means including a drive means having an actuating cam drivingly connected with said rotatable element of said window regulator mechanism, said actuating cam having an outer peripheral cam surface which is generally sawtooth, as viewed in side elevation, a lever pivotally supported intermediate its ends for movement in opposite directions said lever having one end thereof biased into engagement with said cam surface, said reciprocable pumping element having an interruptible driving connection with the other end of said lever, and a control mechanism for establishing and disestablishing a driving connection between said pumping element and said lever, said control mechanism being operable to interrupt the driving connection between the lever and the pumping element when the window regulator mechanism is actuated to move the tailgate window from its closed position towards its open position, but being operable to establish a driving connection therebetween in response to the window regulator mechanism being actuated to move the window from its open position towards its closed position and to automatically interrupt the driving connection therebetween just prior to the window reaching its closed position.

2. The combination defined in claim 1 wherein said pumping element is movable through intake and discharge strokes and is spring actuated through its discharge stroke, said pumping element having a lost motion connection with said lever and wherein said control mechanism normally engages pump plunger to hold the same against movement through its discharge stroke, said lost motion connection allowing said lever to move relative to the pumping element when said actuating cam is rotated in a first direction when a window regulator is moving the window between its closed position towards its open position, said control mechanism engaging said pump plunger when said window regulator mechanism is actuated to move the window from its open position toward its closed position to enable the actuating cam to effect reciprocation of said pump plunger through its intake strokes.

3. In combination, an automotive vehicle having a window, a window regulator mechanism including a rotatable element for moving the window between open and closed positions and a washer unit for squirting washer fluid against the window as the latter is being moved from one of its positions towards its other position, said washer unit including a pump means having a reciprocable pumping element and an actuating means for effecting reciprocable movement of said pumping element when said window is being moved from said one position towards its other position, said actuating means including a drive means having a member supported for movement in opposite directions and having one end thereof operatively connected with said pumping element and an actuating element drivingly connected to said rotatable element of said window regulator mechanism for effecting movement of said drive means in opposite directions, said actuating means being operable to effect reciprocation of said pumping element to cause washer fluid to be squired onto the window in response to rotatable movement of said rotatable element of said window regulator mechanism when the latter is actuated to move the window from said one position towards it other position.

4. In combination, a station wagon vehicle having a tailgate, a rear tailgate window movable between open and closed positions, a window regulator mechanism including a rotatable element for moving the tailgate window between its open and closed positions and a washer unit for squirting washer fluid against the window as the latter is being moved from one position towards its other position, said washer unit including a pump means having a reciprocable pumping element and an actuating means including a drive means having an actuating cam drivingly connected with said rotatable element of said window regulator mechanism, said actuating cam having a cam surface which is generally undulated as viewed in side elevation, said drive means also having a pivotally mounted lever having one end thereof biased into engagement with said cam surface and its other end operatively connected with said pumping element, said actuating means being operable to effect reciprocation of said pumping element to cause washer fluid to be squirted onto the window in response to rotatable movement of said rotatable element of said window regulator mechanism when the latter is operated to move the window from said one position towards its other position.

References Cited
UNITED STATES PATENTS

| 3,257,951 | 6/1966 | Espenschied et al. | 15—250.02 |
| 3,259,069 | 7/1966 | Rogakos | 15—250.02 |
| 3,513,499 | 5/1970 | Miller et al. | 15—250.02 |
| 3,545,027 | 12/1970 | Sargeant et al. | 15—250.04 |
| 3,548,440 | 12/1970 | Kothari | 15—250.01 |
| 3,579,698 | 5/1971 | Verdoodt et al. | 15—250.1 |

CORNELIUS J. HUSAR, Primary Examiner

U.S. Cl. X.R.

15—250.01; 239—284; 417—313